United States Patent [19]
Richmond

[11] 3,868,585
[45] Feb. 25, 1975

[54] AUTOMATIC CROSSFADING DEVICE

[76] Inventor: Charles B. Richmond, 1234 W. 6th Ave., Vancouver 9, B.C., Canada

[22] Filed: Sept. 10, 1973

[21] Appl. No.: 395,728

[52] U.S. Cl. .............................. 330/124 R, 330/141
[51] Int. Cl. .............................................. H03f 3/68
[58] Field of Search ........ 330/29, 30 R, 124 R, 134, 330/141; 179/1 G; 178/DIG. 6

[56] References Cited

UNITED STATES PATENTS

| | | | |
|---|---|---|---|
| 2,244,239 | 6/1941 | Blumlein et al. | 178/DIG. 6 |
| 2,546,338 | 3/1951 | Glasford et al. | 178/DIG. 6 |
| 2,679,554 | 5/1954 | Hurford | 330/124 X |

FOREIGN PATENTS OR APPLICATIONS

| | | | |
|---|---|---|---|
| 639,567 | 6/1950 | Great Britain | 178/DIG. 6 |

*Primary Examiner*—James B. Mullins
*Attorney, Agent, or Firm*— Fetherstonhaugh & Co.

[57] ABSTRACT

Apparatus for smooth exponential crossfading between first and second voltage controlled amplifying means. An exponential ramp voltage generator has a two-position switch which, when actuated, causes the output of the generator to vary up or down exponentially. This output voltage is used to control first signal amplifying means so that the gain of the first amplifying means is decreased as the gain of the second amplifying means is increased and vice versa in an exponential manner.

18 Claims, 2 Drawing Figures

AUTOMATIC CROSSFADING DEVICE

BACKGROUND OF THE INVENTION

This invention relates to apparatus primarily for the playback and mixing of music and sound effects.

For theatrical purposes, such as reproduction of sound effects, mass control of live microphones, controlling sound at conventions, music concerts and recording sessions, it is desirable to be able to pan or crossfade smoothly from one set of amplifer channels to another. At present, this can be done manually by moving knobs or sliders which actuate controls, e.g., potentiometers, often resulting in an uneven transition. When it is desired to pan more than one channel of sound, the general technique is to manipulate two controls simultaneously, to effect a mechanical linking of the two controls, or to mix the desired audio channels into one signal and pass the combined sounds through a single control. Currently, however, all panning facilities are implicitly arranged to move a single original signal from one source to either of two outputs.

SUMMARY OF THE INVENTION

This apparatus is primarily designed for crossfading audio signals and is so described herein, but it is to be understood that it can be used to control any form of electrical signal which voltage controlled amplifiers are capable of reproducing, such as, for example, video signals, digital signals, and the like.

The present invention enables semi-automatic panning or crossfading from one group of audio amplifiers to another through the use of voltage controlled amplifiers (VCA's), no two of which need have any input or output signal in common other than a link to a control voltage signal. In this way, great flexibility is achieved, allowing single switch panning or crossfading between a number of sound sources and distribution possibilities as well as the capability of conventional panning characteristics.

The present invention comprises apparatus for smooth exponential panning or crossfading between first and second voltage controlled amplifying means and comprises first and second DC voltage sources connected to first and second inputs of an exponential ramp voltage generator. The ramp voltage generator has an output and a two-position switch which, when actuated from a first position to a second position, causes the voltage at its output to ramp exponentially from a value substantially equal to the first DC source towards a value substantially equal to the second DC source, and vice versa. The output of the ramp voltage generator is fed to a control terminal of the first voltage controlled amplifying means and to an input of inverting voltage amplifying means biased by a third DC source having an output voltage equal to the arithmetic mean of the first and second DC sources whereby the voltage at the output of the inverting voltage amplifying means varies inversely and equally in accordance with variations at its input. The voltage at the output of the inverting voltage amplifying means is applied to a control terminal of the second voltage controlled amplifying means.

The exponential ramp voltage generator may comprise a capacitor connected between the second input and the outputs and a resistor connected between the output and a two-position switch. In one position of the switch, the resistor is connected to the first input and in the other position of the switch, it is connected to the second input. When the switch is moved from one position to the other, the output voltage varies exponentially from one voltage towards the other.

The resistor is preferably a variable resistor in order to alter the time rate of change of the output voltage of the exponential ramp voltage generator.

The term "exponential" is used herein to indicate what is generally recognized in the industry as a logarithmic relationship between voltage and time with voltage increasing or decreasing in a nonlinear ratio to time.

DESCRIPTION OF THE PREFERRED EMBODIMENTS

Figure 1:
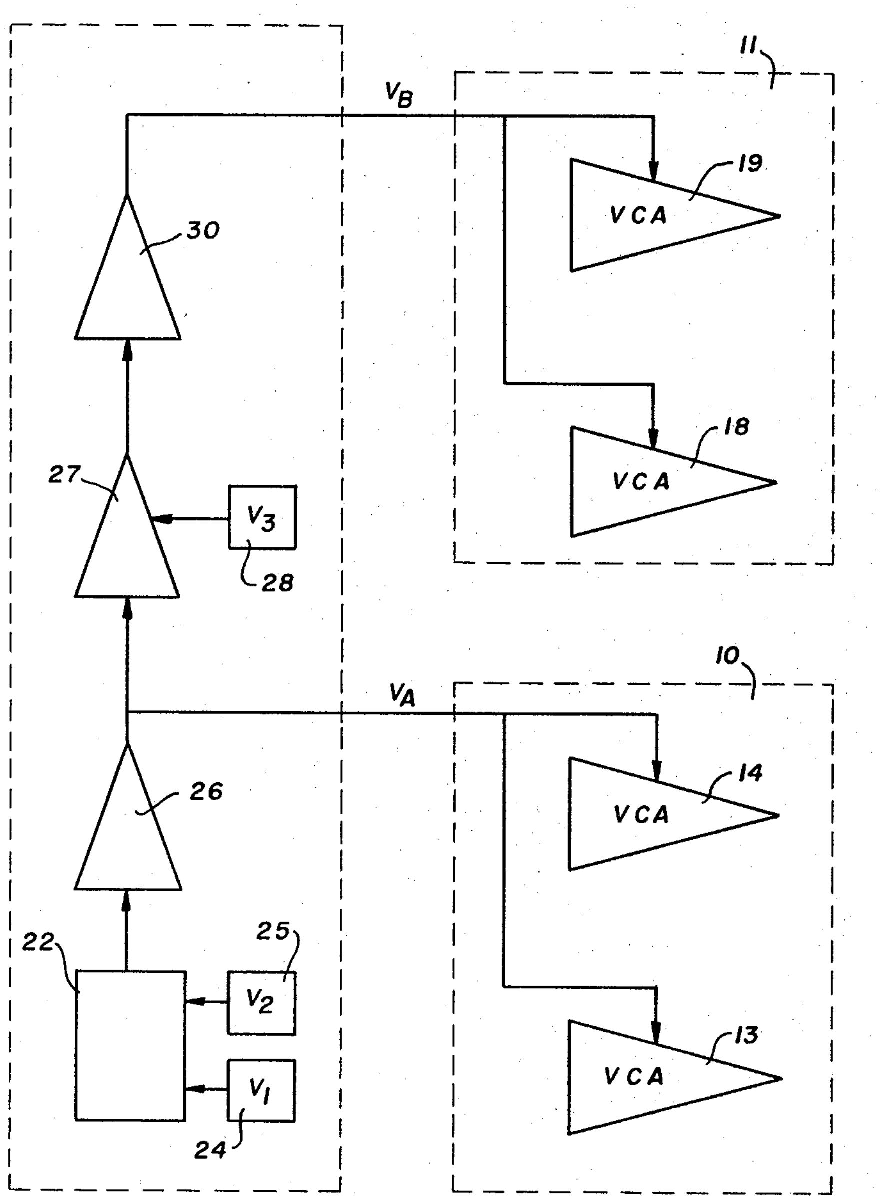
FIG. 1 is a block diagram of an embodiment of a crossfading device in accordance with the present invention used primarily for audio panning.

Referring to FIG. 1, there is shown two groups of audio amplifiers 10 and 11. The first group 10 comprises voltage controlled amplifiers 13 and 14 whereas the second group 11 comprises voltage controlled amplifiers 18 and 19. The two groups are controlled by control voltages $V_A$ and $V_B$, respectively, and, as will be explained more fully hereafter, as $V_A$ increases, $V_B$ decreases by the same amount, and vice versa. Thus as the gain of amplifiers 13 and 14 is increased, the gain of amplifiers 18 and 19 is decreased, and vice versa. The inputs (not shown) to the various amplifiers 13 to 19 may be, but need not be, the same. The amplifiers 13 and 18 could have a common input and the amplifiers 14 and 19 a different common input or all of the amplifiers could have different inputs.

The voltage controlled amplifiers 13 to 19 are controlled by an exponential ramp voltage generator 22 which will be more fully described in connection with FIG. 2. The input terminals of generator 22 are connected respectively to DC voltage sources 24 and 25, said sources having a value of $V_1$ and $V_2$, respectively. Briefly, however, the generator 22 may initially have an output value of $V_1$ but, by actuating a switch in generator 22, its output is caused to ramp exponentially towards a value of $V_2$. If the switch is reversed, the output of generator 22 ramps exponentially from value $V_2$ to $V_1$.

The output of ramp generator 22 is shown as connected to a unity gain current amplifier 26 and the output of amplifier 26 feeds the control inputs of voltage controlled amplifiers 13 and 14. It also feeds an inverting amplifier 27 which is connected to a DC source 28 having an output value $V_3$, which is the arithmetical mean of voltages $V_1$ and $V_2$. As the input $V_A$ to amplifier 27 decreases, its output increases by the same amount, and vice versa. The output of inverting amplifier 27 is fed through a further unity gain current amplifier 30 to the control inputs of voltage controlled amplifiers 18 and 19.

The current amplifiers 26 and 30 may not be necessary in some cases.

The current amplifiers 26 and 30 are, as mentioned above, the unity gain amplifiers. That is, their outputs are identical in voltage level to the inputs applied to them. An example would be an integrated circuit operational type linear amplifier connected in a simple unity-gain configuration, i.e., the output fed directly back to the inverting input.

The values of $V_1$, $V_2$, and $V_3$ will depend on the type of voltage controlled amplifiers used. Typical values vary widely but are generally between the range of −15 to +15 volts for integrated circuit type units and −15 to +30 volts for discrete or hybrid encapsulated units. In circuits actually built using an operational transconductance amplifier such as the type designated CA3080 by RCA, the values were approximately +15, −14.4 and +0.3 volts for $V_1$, $V_2$, and $V_3$, respectively. Other typical values are +1.0, 0.0 and +0.5 volts for the Allison Research VCA-1.

The amplifier 27 is a unity gain inverting amplifier in the sense that its output changes by precisely the same voltage value as its input, $V_A$, but in the opposite direction. The voltage $V_3$ establishes a rotation point about which $V_A$ and $V_B$ may vary. In value it is half-way between the first two voltages $V_1$ and $V_2$ and it allows $V_B$ to vary between the same limits exactly as $V_A$ does. A practical example of such an amplifier would be an operational amplifier with two inputs, the non-inverting input fed directly by voltage source $V_3$ and the inverting input fed by $V_A$, through a resistor of suitable value. A feedback resistor from the output would be taken to the inverting input and this resistor would have the same value as the input resistor.

Many different types of amplifiers are commercially available which would be suitable. For most purposes a general purpose, integrated circuit, operational-type amplifier such as the industry-type 741C will be totally satisfactory for amplifiers 26, 27 and 30. A number of manufacturers have recently introduced high quality VCA's satisfactory for use as amplifiers 13 through 19. Examples of this are the Allison Research model VCA-1, and Orban-Parasound model 169A. DBX Inc. in Massachusetts and Automated Processes in New York also make high quality units. Less expensively, there are numerous circuit designs for VCA's to be constructed using discrete parts, and an inexpensive integrated circuit operational type VCA which can be used is the operational transconductance amplifier put out by RCA, type CA3080.

All of the amplifiers may be integrated circuit type amplifiers if desired but this is certainly not necessary.

Figure 2:
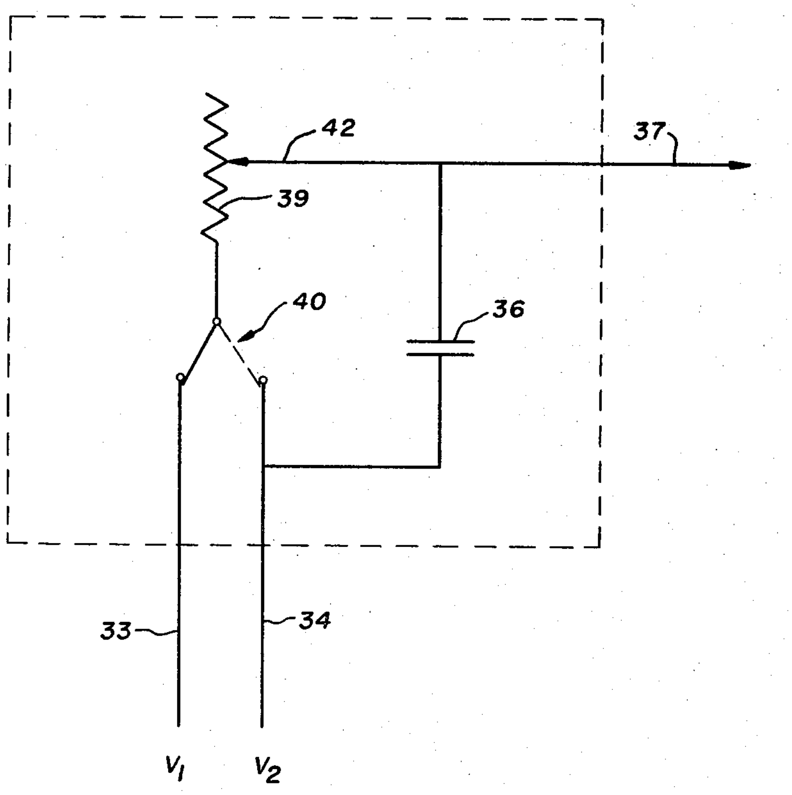
FIG. 2 is a schematic diagram of an exponential ramp voltage generator which may be used in the embodiment of FIG. 1.

Referring to FIG. 2, the exponential ramp voltage source is seen to comprise first and second inputs 33 and 34 to which are connected the source voltages $V_1$ and $V_2$, respectively. Input 34 connects through a capacitor 36 to the output 37. The output 37 is also connected through variable resistor 39 and a two-position switch 40 to the input 33.

Assuming the switch has been in the position shown in FIG. 2 for some time, the output voltage at 37 will be equal to $V_1$. If the switch is now thrown to the second position shown in dotted lines in FIG. 2, the capacitor 36 will begin to discharge exponentially through variable resistor 39, approaching exponentially the voltage $V_2$.

If the switch is then moved back to the position shown in FIG. 2, the capacitor 36 will begin to charge again through resistor 39 towards the voltage $V_1$. Obviously, the rate of charging and discharging of capacitor 36 can be varied by moving the tap 42 on variable resistor 39. This will obviously affect the time rate of change at the inputs of the VCA's 13–19.

The inverting voltage amplifier 27 produces a voltage $V_B$ equal to $V_3 - V_A$.

While FIG. 1 shows two pairs of voltage controlled amplifiers 10 and 11, any number of VCA's could be used in parallel provided the current amplifiers 26 and 30 can supply the required current.

The above description refers mainly to the use of audio voltage controlled amplifiers, but this invention can be used for crossfading video signals merely by substituting for this type of amplifier, a voltage controlled amplifier capable of reproducing video signals.

I claim:

1. Apparatus for smooth exponential cross-fading between first and second voltage controlled amplifying means comprising an exponential ramp voltage generator, said ramp voltage generator having an output and a two-position switch which, when actuated from a first position to a second position, causes the voltage at said output to ramp exponentially in one direction and, when actuated from said second position to said first position, causes the voltage at said output to ramp exponentially in the opposite direction, the output of said ramp voltage generator being fed to a control terminal of said first voltage controlled amplifying means and to an input of inverting voltage amplifying means, whereby the voltage at the output of said inverting voltage amplifying means varies inversely and equally in accordance with variations at its input, the voltage at the output of said inverting voltage amplifying means being applied to a control terminal of said second voltage controlled amplifying means.

2. Apparatus as claimed in claim 1 including first and second DC voltage sources connected to first and second inputs of said ramp voltage generator, said switch respectively causing the voltage at said output to ramp exponentially from a value substantially equal to said first DC source towards a value substantially equal to said second DC source, and causing the voltage at said output to ramp exponentially from a value substantially equal to said second DC source to a value substantially equal to said first DC source.

3. Apparatus as claimed in claim 2 wherein said inverting voltage amplifying means is biased by a third DC source having an output voltage equal to the arithmetic mean of said first and second DC sources.

4. Apparatus as claimed in claim 1 wherein said ramp voltage generator includes means for varying the rate of change of voltage at its output.

5. Apparatus as claimed in claim 2 wherein said exponential ramp voltage generator comprises a capacitor connected between said second input and said output and a reistor connected between said output and a two-position switch, one position of the switch connecting said resistor to said first input and the other position of said switch connecting the resistor to said second input.

6. Apparatus as claimed in claim 5 wherein said resistor is a variable resistor.

7. Apparatus as claimed in claim 2 wherein the voltage of said first DC voltage source is substantially equal to the maximum control voltage for said first and second voltage controlled amplifying means and the voltage of said second DC source is substantially equal to the minimum control voltage for said first and second voltage controlled amplifying means.

8. Apparatus as claimed in claim 1 wherein the output of said ramp generator is fed to the control terminal of said first voltage controlled amplifying means via a unity gain current amplifier.

9. Apparatus as claimed in claim 1 wherein the output of said inverting voltage amplifying means is fed to the control terminal of said second voltage controlled amplifying means via a unity gain current amplifier.

10. Apparatus for smooth exponential cross-fading between first and second voltage controlled amplifying means comprising first and second DC voltage sources connected to first and second inputs of an exponential ramp voltage generator, said ramp voltage generator having an output and a two-position switch which, when actuated from a first position to a second position, causes the voltage at said output to ramp exponentially from a value substantially equal to said first DC source towards a value substantially equal to said second DC source and, when actuated from said second position to said first position, causes the voltage at said output to ramp exponentially from a value substantially equal to said second DC source to a value substantially equal to said first DC source, the output of said ramp voltage generator being fed to a control terminal of said first voltage controlled amplifying means and to an input of inverting voltage amplifying means, biased by a third DC source having an output voltage equal to the arithmetic mean of said first and second DC sources whereby the voltage at the output of said inverting voltage amplifying means varies inversely and equally in accordance with variations at its input, the voltage at the output of said inverting voltage amplifying means being applied to a control terminal of said second voltage controlled amplifying means.

11. Apparatus as claimed in claim 10 wherein said ramp voltage generator includes means for varying the rate of change of voltage at its output.

12. Apparatus as claimed in claim 10 wherein said exponential ramp voltage generator comprises a capacitor connected between said second input and said output and a resistor connected between said output and a two-position switch, one position of the switch connecting said resistor to said first input and the other position of said switch connecting the resistor to said second input.

13. Apparatus as claimed in claim 12 wherein said resistor is a variable resistor.

14. Apparatus as claimed in claim 10 wherein said first and second voltage controlled amplifying means each comprise a plurality of voltage controlled amplifiers.

15. Apparatus as claimed in claim 11 wherein said first and second voltage controlled amplifying means each comprise a plurality of voltage controlled amplifiers.

16. Apparatus as claimed in claim 10 wherein the voltage of said first DC voltage source is substantially equal to the maximum control voltage for said first and second voltage controlled amplifying means and the voltage of said second DC source is substantially equal to the minimum control voltage for said first and second voltage controlled amplifying means.

17. Apparatus as claimed in claim 10 wherein the output of said ramp generator is fed to the control terminal of said first voltage controlled amplifying means via a unity gain current amplifier.

18. Apparatus as claimed in claim 10 wherein the output of said inverting voltage amplifying means is fed to the control terminal of said second voltage controlled amplifying means via a unity gain current amplifier.

* * * * *